Figure 1:
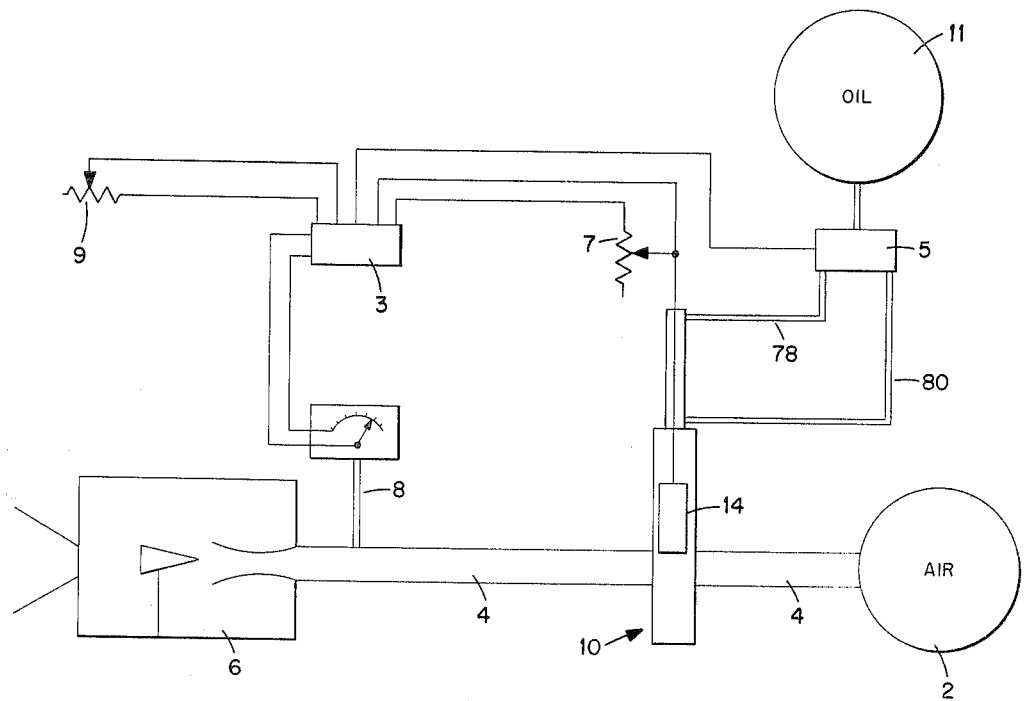

March 22, 1966   O. C. HOLDERER   3,241,807
FLUID PRESSURE ACTUATED FLOW CONTROL GATE VALVE
Filed Jan. 11, 1963                                      3 Sheets-Sheet 1

Oscar C. Holderer,
*INVENTOR.*
BY S. J. Ratondi
   A. J. Dupont
   Jack W. Voigt March 22, 1966  O. C. HOLDERER  3,241,807
FLUID PRESSURE ACTUATED FLOW CONTROL GATE VALVE
Filed Jan. 11, 1963  3 Sheets-Sheet 2
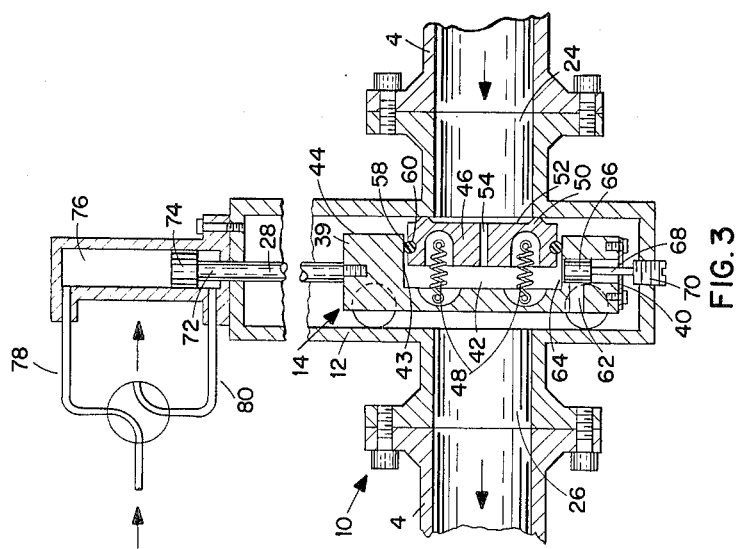
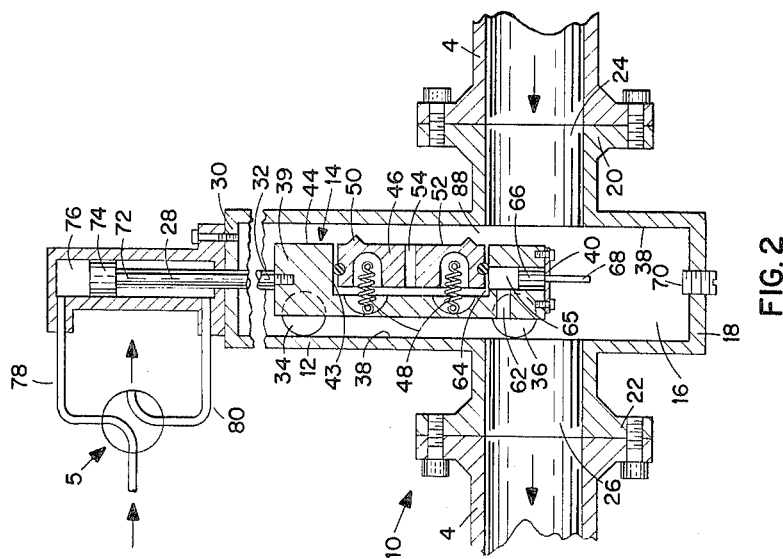
Oscar C. Holderer,
INVENTOR.
BY March 22, 1966  O. C. HOLDERER  3,241,807
FLUID PRESSURE ACTUATED FLOW CONTROL GATE VALVE
Filed Jan. 11, 1963  3 Sheets-Sheet 3

Oscar C. Holderer,
INVENTOR.

BY S. J. Ratondi
A. L. Dupont
Jack W. Voigt

United States Patent Office 3,241,807
Patented Mar. 22, 1966

3,241,807
FLUID PRESSURE ACTUATED FLOW CONTROL GATE VALVE
Oscar C. Holderer, Huntsville, Ala., assignor to the United States of America as represented by the Secretary of the Army
Filed Jan. 11, 1963, Ser. No. 250,960
6 Claims. (Cl. 251—158)

The invention described herein may be manufactured and used by or for the Government for governmental purposes without the payment of any royalty thereon.

This invention relates to a gate type flow control valve and more particularly to the type of gate valve which is used as an upstream valve in high pressure fluid systems, as for example in a wind tunnel.

In any wind tunnel system, a constant set of environmental conditions must be maintained in the tunnel's test chamber during the entire duration of a test run. Wind tunnel systems drawing air from a stored quantity of compressed air must have a means to constantly regulate air flow since it is obvious that during a test run a pressure drop will occur in the stored air supply. The upstream valve of such a system needs to compensate for this air pressure drop by gradually opening to permit a larger volumetric flow of air through the valve to thus maintain constant environmental conditions in the test chamber during a test run. Also it is desirable to have an upstream valve that is relatively maintenance free, is of jam proof construction, and is able to withstand high differential pressures present in a wind tunnel system.

Therefore, it is an object of this invention to provide a gate valve able to withstand high differential pressures having the features of being relatively friction-free and lightweight.

Another object of this invention is to provide a gate valve in which the sealing surfaces are subjected to a minimum of wear over extended periods of use.

Still another object is to provide a gate valve in which the sealing force is solely dependent upon the upstream pressure and in which the sealing force varies directly as the upstream pressure.

A still further object of this invention is to provide a gate valve in which the plot of valve opening versus flow rate of fluids passing through the valve is nearly linear for all openings of the gate.

Figure 4:
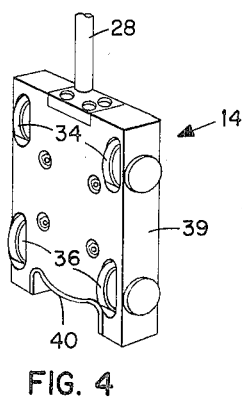
Figure 5:
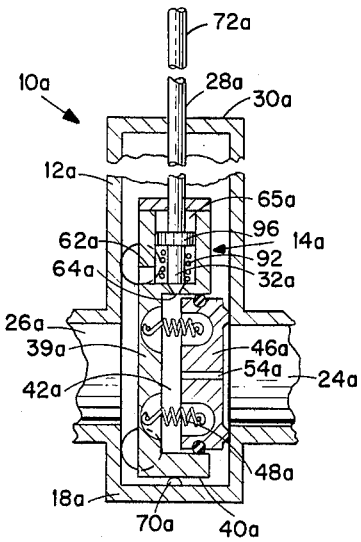
Figure 6:
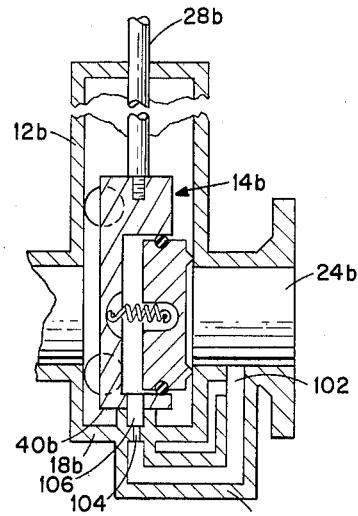
Figure 7:
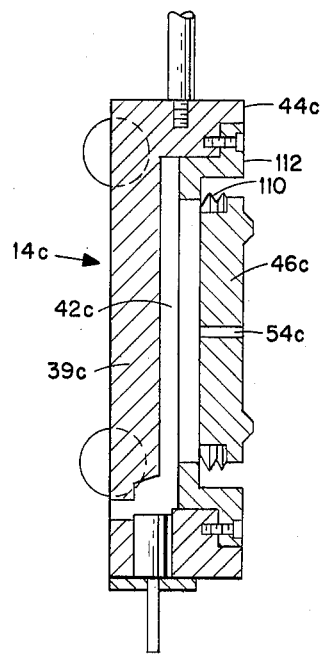

The foregoing objects will become more apparent upon consideration of the following detailed description and accompanying drawings in which:

FIGURE 1 is a schematic view of the wind tunnel and valve positioning apparatus;
FIGURE 2 is a sectional view of the flow control gate valve in a partly open position;
FIGURE 3 is a similar sectional view showing the flow control gate valve in a closed position;
FIGURE 4 is a perspective view of the gate;
FIGURE 5 is a view similar to FIGURE 3 but showing a variation of the bleed port sealing means;
FIGURE 6 is a sectional view of another embodiment showing the valve in a closed position; and
FIGURE 7 is a sectional view showing a modified form of the gate assembly.

Referring to the drawings FIGURE 1 shows the valve 10 of this invention integrated into a wind tunnel system. The valve regulates the air flow from air source 2 through line 4 and into test chamber 6. A pressure sensing device 8 located in line 4 downstream of valve 10 adjacent the test chamber inlet monitors air pressures at this point. Intelligence from pressure sensing device 8 is compared with a preset standard of conditions 9 by an integrating device 3. When informed of a deviation from preset conditions, as a change in air pressure, integrator device 3 relays a correction signal to servo valve 5. Servo valve 5 is then actuated to reposition valve gate 14 with hydraulic pressure from source 11 as will be described hereinbelow. A feed-back system 7 attached to gate 14 measures linear movement of the gate and relays this measurement to integrator device 3 to prevent excessive hunting of the valve.

In the modification illustrated in FIGURES 2–4, the flow control valve 10 of this invention is shown to include an elongate housing 12 and a movable gate 14. Housing 12 encloses a compartment 16 and includes a base 18 and flanged portions 20 and 22 spaced outwardly from opposite sides of the housing adjacent base 18. To convey fluid through housing 12 flanged portions 20 and 22 are provided with aligned inlet and outlet ports 24 and 26 respectively.

The fluid flow through the housing is controlled by gate 14. The gate is disposed in compartment 16 and is arranged for movement normal to aligned ports 24 and 26. An operating rod 28 has its inner end 32 fixed to gate 14 and its outer end extending through top 30 of housing 12. The rod imparts movement to the gate in a manner described hereinbelow.

Gate 14 is provided on its rear surface with spaced pairs of wheels 34 and 36 journaled to the gate adjacent opposite ends thereof. Pairs of wheels 34 and 36 bear against the inner surface 38 of housing 12 to insure generally friction free motion of the gate relative to the housing.

Gate 14 (FIGURES 2 and 3) includes a block 39 having a base 40 and a cylindrical recess 42 opening through one side of the block. The recess slidably mounts a laterally movable piston 46. Piston 46 is normally retained in recess 42 by tension springs 48 which are hooked at their opposite ends to the piston and block 39. An annular sealing projection 50 is formed integral with the front surface 52 of piston 46. A bore 54 extends through piston 46 to provide an entrance path for fluid from inlet port 24 to recess behind the piston. An O-ring 58 is seated in a groove 60 about the circumference of piston 46 and is in sealing engagement with wall 43 of recess 42.

Fluid can be exhausted from recess 42 to compartment 16 through a bleed port 62 contained in block 39 adjacent its base 40. The bleed port is in sealable communication with recess 42 at inlet 64. Sealing of inlet 64 to allow a pressure build up in recess 42 is accomplished by a plunger 66 slideably mounted in a cylinder 65 in block 39. The plunger is provided with a stem 68 which is adapted to engage a screw stop 70 located in the base 18 of housing 12 to force plunger 66 into a sealing position (FIGURE 3). Engagement of stem 68 and screw stop 70 occurs when the gate has moved to a position transverse the aligned ports 24 and 26.

As set forth above movement is imparted to the gate by operating rod 28. The outer end 72 of the rod is fixed to a hydraulically operated double acting piston 74 which lies in cylinder 76. Four-way servo valve 5 controls the entry of hydraulic fluid to cylinder 76 from a fluid source 11 through lines 78 and 80. Lines 78 and 80 are in communication with cylinder 76 above and below piston 74 respectively. Actuation of four-way servo valve 5 in a direction to cause hydraulic fluid to enter the cylinder 76 through line 78 lowers gate 14. Similarly positioning valve 5 to cause hydraulic fluid to enter cylinder 76 through line 80 raises gate 14.

In operation the flow control valve 10 is tied into a fluid flow line 4 for purposes of controlling the flow through this line. With gate 14 at its topmost position, fluid in line 4 flows unobstructed through housing 12 and valve 10 is said to be in the full open position.

Gate 14 can be lowered to any partially open or flow control position by actuation of four-way servo valve 5 as has been described. In any partially open position base 40 of the gate extends into the path of fluid flowing from port 24 to port 26.

Base 40 of block 39 has an arcuate profile (FIGURE 4) which effects nearly linear flow control of the fluid flowing from port 24 to port 26. In other words a graph of flow rate versus valve opening is nearly linear. This is a desirable feature of valve 10 from a control point of view in that the flow rate for any partial valve opening can easily be foreseen.

In any partially gate open position the piston 46 is kept retracted in recess 42 both by the action of tension springs 48 (FIGURE 2), and by the pressure of the fluid flow from port 24 impinging upon the piston surface 52. Any fluid entering recess 42 can escape to compartment 16 through open bleed port 62. The area of bleed port 62 is much larger than the area of bore 54 through piston 46 to eliminate any possibility of pressure build up in recess 42 behind the piston when gate 14 is in any partial open position.

As gate 14 lowers further a point is ultimately reached wherein piston 46 aligns with inlet port 24. At this point the still retracted piston 46 completely obstructs the fluid flow through this port but does not yet seal port 24. With the piston 46 in this position the proximity of annular sealing projection 50 to inner surface 38 of housing 12 defines an interstice 88. The interstice 88 acts as an orifice to lower the pressure of the fluid deflected by piston 46.

In lowering gate 14 another increment the plunger stem 68, which is at this point in contact with screw stop 70, causes inlet 64 of bleed port 62 to be sealed by plunger 66 (FIGURE 3). With bleed port 62 sealed, fluid from inlet port 24 now entering recess 42 through bore 54 can no longer escape to compartment 16. The influx of fluid into recess 42 produces a pressure build up in the recess equal to the pressure of fluid in line 4. Due to the previously described action of interstice 88 only the area of front surface 52 of piston 46 which is surrounded by annular sealing projection 50 is exposed to the fluid pressure from line 4. Therefore, the piston area exposed to the fluid pressure in recess 42 is greater than the piston area exposed to the fluid pressure from inlet port 24. The net result is a force or differential pressure on piston 46 directed upstream to the normal fluid flow from port 24 to port 26. This net force or differential pressure moves piston 46 linearly until annular sealing projection 50 is seated around inlet port 24 to completely seal the port (FIGURE 3).

Any increase in the fluid pressure at piston surface 52 is transferred by bore 54 to the larger area behind the piston. Thus, the sealing force varies directly as the upstream pressure and no additional force need be applied to gate 14 through rod 28 to keep annular sealing projection 50 seated once the seal is effected.

Upon reversing the four-way servo valve 5 hydraulic fluid from the fluid source 11 is forced to enter cylinder 76 through line 80 causing the gate 14 to be moved toward the top 30 of housing 12. Moving the gate assembly a very slight amount in this direction causes the plunger 66 to move from inlet 64 opening bleed port 62 to allow the fluid entrapped in recess 42 to escape through the bleed port and into compartment 16. Movement of gate 14 opening bleed port 62 is not imparted to the seated piston 46 as this movement is slight enough to be taken up by a deformation of O-ring 58. Once the fluid has been exhausted from recess 42 the pull of tension springs 48 coupled with the fluid pressure in the flow line 4 against piston surface 52 causes piston 46 to be retracted into recess 42. The projection 50 moves away from its sealing position thereby opening inlet port 24.

The gate assembly can now be moved to any predetermined position without causing wear on the annular sealing projection 50 since no frictional contact of this projection with the inner surface 38 of housing 12 can occur.

The embodiment illustrated in FIGURE 5 is substantially the same as that illustrated in FIGURES 2–4. Those elements which are the same, or perform the same function, are given the same reference numeral with the letter "a" appended thereto. In this embodiment block 39a is reversed end-for-end so that bleed port 62a is now located above inlet and outlet ports 24a and 26a respectively. Further in this embodiment rod 28a replaces plunger body 66 of FIGURES 2 and 3 as the bleed port sealing member by having its inner end 32a tapered to mateably engage bleed port inlet 64a. Rod 28a extends into cylinder 65a in block 39a and fixedly carries a collar 96 slideably disposed in cylinder 65a. A tension spring 92 disposed about the rod biases collar 96 and therefore rod 32a away from bleed port inlet 64a.

In operation, a force is applied to end 72a of rod 28a in a direction acting to lower gate 14a. As the rod is lowered collar 96 compresses spring 92 against the surface of block 39a adjacent the bleed port inlet. When the spring bias due to this compression becomes equal to the gate closing force exerted by rod 28a gate 14a will be moved toward housing base 18a and across aligned ports 24a and 26a. The spring bias becomes equal to the gate closing force before rod end 32a becomes engaged with bleed port inlet 64a. Thus the bleed port inlet remains unsealed while gate 14a lowers.

Continuing to lower gate 14a will bring base 40a of the gate into contact with stop 70a located in housing base 18a preventing further motion of gate 14a towards the housing base. Due to the biasing action of spring 92 rod 28a can continue to move downward after gate motion has ceased. The rod end 32a moves into mating contact with bleed port inlet 64a allowing fluid entering recess 42a through bore 54a to build up a pressure in recess 42a behind piston 46a. The sealing of inlet port 24a by piston 46a then continues in a manner as was described hereinabove.

Unsealing of inlet 64a is accomplished by reversing the external force on rod end 72a to withdraw the rod end 32a from its sealing contact with bleed port inlet 64a. Unsealing the bleed port inlet allows fluid trapped in recess 42a to exhaust through the now open bleed port 62a to compartment 16a. The unseating of piston 46a from about inlet port 24a then continues in a manner described hereinabove.

In the embodiment illustrated in FIGURE 6 those elements substantially the same or performing the same functions as corresponding elements in the embodiment of FIGURES 2–4 have the same reference numeral with the letter "b" appended thereto.

The embodiment of FIGURE 6 is shown to include a by-pass conduit 100 formed integral with housing 12b. The conduit has one end 102 in communication with inlet port 24b and its other end defining a passage 104 through housing base 18b for communication with bleed port 106. Bleed port 106 of this embodiment is located vertically through base 40b of gate 14b and replaces bleed port 62 of the embodiments previously described.

In operation gate 14b is moved toward housing base 18b by the action of rod 28b as described hereinabove. As the gate is moved to its lowest most position a contact is made between the gate and housing base 18a. This contact both stops the downward movement of gate 14b and allows communication between bleed port 106 and passage 104 to occur. A portion of the fluid from inlet port 24b is diverted through conduit 100 and passage 104 into bleed port 106 to allow a build up of fluid pressure in recess 42b behind piston 46b. Thus is can be seen that in this embodiment the bore 54 through piston 46 and plunger 66 of the embodiment described above have been replaced by the function of by-pass conduit 100.

Upon reversing the motion of gate 14b, the contact between bleed port 106 and passage 104 is broken allowing fluid from recess 42b to exhaust directly into compartment 16b. The unsealing of inlet port 24b then proceeds as described in the previous embodiments.

The embodiment shown in FIGURE 7 differs in that the function of tension springs 48 and O-ring 58 described in the previous embodiments has been replaced by a single bellows member 110. Bellows member 110 allows normal lateral movement of piston 46c while maintaining a fluidtight seal between recess 42c and the piston. An insert 112 is mounted to surface 44c of block 39c to adapt the block to carry the bellows member. All other actions of this embodiment remain similar to those previously described.

Thus it will be appreciated that this invention provides a relatively lightweight gate valve in which the sealing surfaces are subjected to a minimum of wear and in which the sealing force of the valve varies directly as the upstream pressure.

It is to be understood that various modifications of the gate valve described herein can be made without changing the spirit and scope of the invention as claimed.

The invention claimed is:

1. A flow control valve for controlling flow of fluid therethrough comprising: a valve housing, said housing having a top, a base and enclosing a compartment, said housing having aligned inlet and outlet ports in communication with said compartment; a seating surface surrounding said inlet port; a gate disposed within said compartment for movement in a path normal to said ports, said gate having a cylindrical chamber opening through one side thereof, the axis of said cylindrical chamber being parallel to the axis of said aligned ports; a passageway passing through said gate providing fluid communication between said compartment and said chamber; means for sealing said passageway; a laterally movable piston disposed in said cylindrical chamber having an inner and outer face; an annular sealing projection formed integrally on the outer face of said piston; means communicating with said inlet port and said cylindrical chamber for passing said fluid to said inner face of said piston providing for the establishment of a pressure differential across said piston, said pressure differential acting to sealably seat said piston against said seating surface; resilient means acting in opposition to said pressure differential to retain said piston in said cylindrical chamber; a flexible seal means disposed between said piston and said chamber providing for a fluid tight seal therebetween; means connected to said gate for aligning said piston with one of said aligned ports; and an anti-friction means carried by said gate for allowing generally friction-free motion of said valve gate relative to said housing.

2. A flow control valve as set forth in claim 1 in which said means for providing a pressure differential across said piston comprises a bore through said piston, said bore permitting fluid from said inlet port access to said chamber.

3. A flow control valve as set forth in claim 1 in which said means for establishing a pressure differential across said piston comprises a by-pass conduit formed integrally with said housing, said conduit having one end in communication with said inlet port and one end in communication with said compartment through the base of said housing, said conduit acting in association with said passageway to provide fluid communication between said inlet port and said chamber.

4. A flow control valve as set forth in claim 1 in which said resilient means and said seal means comprises a bellows member.

5. A flow control valve as set forth in claim 1 wherein the base of said gate which passes through the fluid flow is arcuately shaped so as to impart a generally linear flow characteristic to fluid passing through said valve.

6. A flow control gate valve comprising: a housing, said housing having aligned inlet and outlet ports; a movable gate disposed in said housing; a cylindrical chamber generally U-shaped in cross section disposed in said gate; a piston slidably mounted in said chamber and movable in a path normal to the motion of said gate, said piston having a bore therethrough providing fluid communication between said inlet port and said chamber behind said piston to effect a differential pressure across said piston to seat the piston against one of the aligned ports to seal the latter; a means in said gate to provide venting of said chamber behind said piston for reversing the differential pressure, said reversal being operative to unseat the piston; a resilient means opposing said pressure differential and aiding said reversed pressure differential; a gasket disposed between the piston and the chamber providing a flexible fluid tight seal therebetween; an anti-friction means carried by said gate and disposed between said gate and said housing providing generally friction free motion of said gate.

References Cited by the Examiner

UNITED STATES PATENTS

| | | | |
|---|---|---|---|
| 502,939 | 8/1893 | Van Matie | 251—175 |
| 686,703 | 11/1901 | Bickford | 251—175 |
| 708,990 | 9/1902 | Bickford | 251—175 |
| 715,745 | 12/1902 | Bickford | 251—175 |
| 1,680,285 | 8/1928 | Dockings | 251—175 |
| 2,042,067 | 5/1936 | Leach | 251—175 X |
| 2,391,278 | 12/1945 | Stark | 251—175 |
| 2,819,034 | 1/1958 | Holderer | 251—175 X |
| 2,850,260 | 9/1958 | Perazone | 251—203 X |
| 2,858,096 | 10/1958 | Warren | 251—175 X |
| 2,879,800 | 3/1959 | Komrosky | 251—175 X |
| 3,043,554 | 7/1962 | Garza | 251—175 |

FOREIGN PATENTS

| | | |
|---|---|---|
| 10,972 | 1/1933 | Australia. |
| 913,652 | 12/1962 | Great Britain. |

ISADOR WEIL, *Primary Examiner.*

CLARENCE R. GORDON, *Examiner.*